United States Patent
McLennaghan et al.

(10) Patent No.: US 12,291,657 B2
(45) Date of Patent: May 6, 2025

(54) ADHESIVE COMPOSITION

(71) Applicant: Dow Global Technologies LLC, Midland, MI (US)

(72) Inventors: Allan Walter McLennaghan, Horgen (CH); Yi Jin, Lake Jackson, TX (US); Jozef J. I. Van Dun, Horgen (CH); Ryan Schneider, Lake Jackson, TX (US); Wanfu Ma, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 663 days.

(21) Appl. No.: 17/603,790

(22) PCT Filed: Apr. 15, 2019

(86) PCT No.: PCT/CN2019/082617
§ 371 (c)(1),
(2) Date: Oct. 14, 2021

(87) PCT Pub. No.: WO2020/210931
PCT Pub. Date: Oct. 22, 2020

(65) Prior Publication Data
US 2022/0213355 A1    Jul. 7, 2022

(51) Int. Cl.
*C09J 123/08*    (2006.01)
*C08L 91/06*    (2006.01)

(52) U.S. Cl.
CPC ......... *C09J 123/0815* (2013.01); *C08L 91/06* (2013.01)

(58) Field of Classification Search
CPC .................... C09J 123/0815; C08L 93/04
See application file for complete search history.

(56) References Cited

U.S. PATENT DOCUMENTS

| | | |
|---|---|---|
| 5,677,383 A | 10/1997 | Chum et al. |
| 6,107,430 A | 8/2000 | Dubois et al. |
| 6,111,023 A | 8/2000 | Chum et al. |
| 6,319,979 B1 | 11/2001 | Dubois et al. |
| 9,803,113 B2 | 10/2017 | Tse |
| 9,969,912 B2 | 5/2018 | LiPiShan et al. |
| 10,014,562 B2 | 7/2018 | Sloop |
| 10,385,242 B2 | 8/2019 | Chen et al. |
| 2013/0023627 A1* | 1/2013 | Layman ............... C08L 23/10 525/240 |
| 2015/0108989 A1 | 4/2015 | Sloop |
| 2015/0166850 A1* | 6/2015 | Tse ............... C09J 123/12 525/240 |
| 2015/0166853 A1* | 6/2015 | Chen ............... C09J 11/08 428/355 EN |
| 2016/0304756 A1* | 10/2016 | Lipi Shan ............. C09J 153/00 |
| 2016/0312088 A1 | 10/2016 | Brown et al. |
| 2017/0080697 A1* | 3/2017 | Wada ............... B32B 27/304 |
| 2018/0334597 A1 | 11/2018 | Eichler-Johnson et al. |

* cited by examiner

*Primary Examiner* — Anthony J Frost
(74) *Attorney, Agent, or Firm* — Boyle Fredrickson, S.C.

(57) ABSTRACT

The present disclosure provides a composition. The composition contains (A) an ethylene/α-olefin copolymer containing (i) ethylene and (ii) from 20 wt % to 35 wt % $C_6$-$C_8$ α-olefin comonomer, the ethylene/α-olefin copolymer having a density from 0.880 g/cc to 0.895 g/cc, a melt viscosity, at 177° C., from 4,000 mPa·s to 20,000 mPa·s, and a glass transition temperature from −55° C. to −20° C.; (B) a tackifier, and (C) a wax.

13 Claims, 1 Drawing Sheet

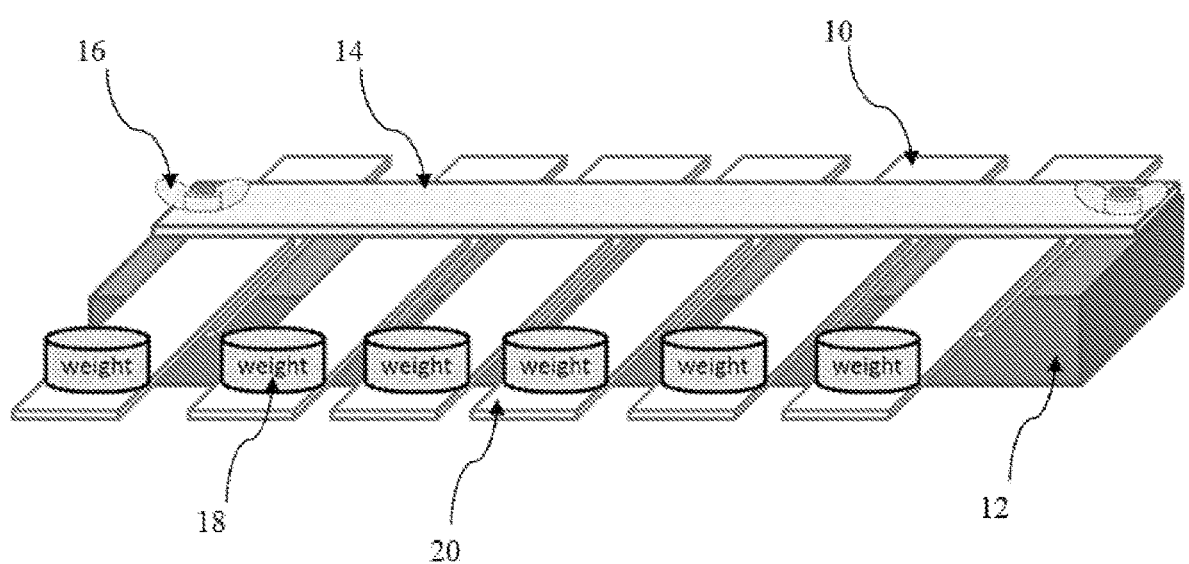

ADHESIVE COMPOSITION

BACKGROUND

In the adhesive industry, ethylene-based polymer is formulated with tackifier and wax for the production of hot melt adhesive (HMA) with adhesion properties suitable for packaging adhesive and other applications. Other factors being equal, the comonomer content and structure of the ethylene-based polymer (and therefore the properties of the ethylene-based polymer) can influence the adhesive performance of the HMA. Changing the type and content of the comonomer can correspondingly change the melt viscosity and other properties of the ethylene-based polymer, thereby impacting HMA performance, such as fiber tear, for example.

The art recognizes the need to expand the variety of ethylene-based polymers useful in HMA formulations offering suitable adhesive performance.

SUMMARY

The present disclosure provides a composition. The composition contains (A) an ethylene/α-olefin copolymer containing (i) ethylene and (ii) from 20 wt % to 35 wt % $C_6$-$C_8$ α-olefin comonomer, the ethylene/α-olefin copolymer having a density from 0.880 g/cc to 0.895 g/cc, a melt viscosity, at 177° C., from 4,000 mPa·s to 20,000 mPa·s, and a glass transition temperature from −55° C. to −20° C.; (B) a tackifier; and (C) a wax.

The present disclosure also provides an article. The article contains at least one component formed from a composition containing (A) an ethylene/α-olefin copolymer containing (i) ethylene and (ii) from 20 wt % to 35 wt % $C_6$-$C_8$ α-olefin comonomer, the ethylene/α-olefin copolymer having a density from 0.880 g/cc to 0.895 g/cc, a melt viscosity, at 177° C., from 4,000 mPa·s to 20,000 mPa·s, and a glass transition temperature from −55° C. to −20° C.; (B) a tackifier; and (C) a wax.

BRIEF DESCRIPTION OF THE DRAWINGS

FIG. 1 is a schematic representation of a heat stress sample holder in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "adhesive composition" is a mixture of components that is capable of joining substrates of interest together under an application of heat and/or pressure. A nonlimiting example of a suitable adhesive composition is a hot melt adhesive (HMA) composition. A "hot melt adhesive (HMA) composition" is a mixture of components that is capable of joining substrates of interest together under the application of heat, or more typically, the application of heat and pressure.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available from LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$α-olefin copolymer that has one distinct peak in a gel permeation chromatography (GPC) showing the molecular weight distribution. A "multimodal ethylene copolymer" is an ethylene/$C_4$-$C_{10}$α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-1a α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

A "rosin" is a mixture of resin acids, which are carboxylic acids. Nonlimiting examples of suitable rosins include gum rosin, wood rosin, tall oil rosin, and combinations thereof. Nonlimiting examples of suitable resin acids include abietic acid, neoabietic acid, dehydroabietic acid, palustric acid, levopimaric acid, pimaric acid, isopimaric acids, and combinations thereof.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

Test Methods

Acid value (or acid number) is measured in accordance with ASTM D1386/7. Acid value is a measure of the amount of unreacted fatty acid present in a substance. The acid value is the number of milligrams of potassium hydroxide required for the neutralization of free fatty acids present in one gram of a substance (e.g., the wax). Units for acid value are mg KOH/g.

Density is measured in accordance with ASTM D792, Method B. The result is recorded in grams (g) per cubic centimeter (g/cc or g/cm³).

Drop point is measured in accordance with ASTM D3954.

Fiber Tear (%) Percent fiber tear (FT) of compositions using Inland corrugated cardboard is determined according to a standardized method. The sample composition is heated to 170° C. and a bead of sample composition (applied at a weight of 2.1 gram per meter) is applied on to a cardboard coupon (25.4 mm×76.2 mm) by drawing the sample composition lengthwise down the cardboard coupon with a spatula or hot melt applicator, and a second coupon is quickly placed (within 1 second) on top of the sample composition, with a pressure of 2.5 bar (250 kPa) for 10 seconds to hold the bond in place. Samples are conditioned for 24 hours at room temperature and 54% relative humidity. Immediately after conditioning, samples (n=5) are pulled apart by inserting the blade of a spatula under one corner to fold up the corner. The sample is then placed on a horizontal surface, with the side having the folded corner facing up. With the sample held as near as possible to a heating or cooling source set at the test temperature, the folded corner is manually pulled as rapidly as possible at approximately a 45-90° angle, relative to each coupon's lengthwise axis, to tear the adhesive bond. The percent of torn fiber (fiber tear) is estimated in 25% increments (that is, 0%, 25%, 50%, 75%, and 100%), and the average is recorded.

Heat stress resistance (heat stress) is measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction) having dimensions of 2 inches (50.8 mm)×3-³⁄₁₆ in (81 mm) and 2 in (50.8 mm)× 5-½ in (139.7 mm) are bonded by applying 0.000141b/in of the composition (about 0.12-0.13 gram) using an Inatec Bond Tester (application temperature 177° C.). This tester is used to compress the coupons at a constant pressure, and without a further application of heat. The composition is applied perpendicular to the flutes in the center of the shorter coupon and the coupons are bonded such that the composition was % in (19 mm) from one end of the long coupon. Five replicates are made for each composition. Each coupon is stored for 24 hours, at 22° C.-23° C., and 50% relative humidity. As shown in FIG. 1, samples (10) are then loaded into a sample holder (12), with the short coupon end aligned with the edge of the sample holder (12), as shown in FIG. 1. The samples (10) are held in place with a wide plate (14) of the sample holder (10), and the plate (14) is secured by wingnuts (16) to the sample holder (12). A "200 g" weight (18) is attached to the coupon (20), at a distance of 3.94 in (100 mm) from the bond. The weight (18) is secured by placing the peg attached to the weight into a hole made in the end of the longer coupon. The sample holder (12), containing the coupon (20) and the attached weight (18), is then placed into a convection oven (not shown), equilibrated at a set temperature, and remained in the oven for 24 hours. At the end of the 24 hours, if at least 80% of the bonds (i.e., 4 bonds) do not fail, then the sample is considered to have passed heat resistance testing at the test temperature. The oven temperature is varied, until the maximum passing heat stress resistance (temperature) is determined. All new bonded coupon samples are used for each test temperature. Results are reported as heat stress temperature (° C.).

Melt viscosity is measured in accordance with ASTM D 3236 using a Brookfield Viscometer (Model DV0III, version 3), and a SC-31 hot-melt viscometer spindle, at 177° C. for the ethylene-based copolymer; at 177° C. for the composition; at 135° C. for the ethylene-based polymer wax; and at 170° C. for the propylene-based polymer wax. The sample is poured into an aluminum disposable tube-shaped chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams) is heated to the required temperature until the melted sample was one inch below the top of the sample chamber. The viscometer apparatus is lowered, and the spindle submerged into the middle of the sample chamber, wherein the spindle does not touch the sides of the chamber. Lowering is continued, until the brackets on the viscometer align on the Thermosel. The viscometer is turned on, and set to operate at a steady shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Ring-and-ball softening point is measured using a Mettler Toledo FP900 Thermosystem according to ASTM E28.

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min was used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, $T_m$, and extrapolated onset of crystallization, $T_c$.

Melting point, $T_m$, is determined from the DSC heating curve by first drawing the baseline between the start and end of the melting transition. A tangent line is then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turied, 2d ed. 1997).

Glass transition temperature, $T_g$, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turied, 2d ed. 1997). Baselines are drawn from below and above the glass transition region and extrapolated through the $T_g$ region. The temperature at which the sample heat capacity is half-way between these baselines is the $T_g$.

Peel Adhesion Failure Temperature (PAFT) and Shear Adhesion Failure Temperature (SAFT)

Peel adhesion failure temperature (PAFT) is tested according to ASTM D 4498 with a 100 gram weight using a Cheminstruments OSI-8 programmable oven in the peel mode. The tests are started at 40° C. and the temperature is increased at an average rate of 0.5° C./minute.

Shear Adhesion Failure Temperature (SAFT) is measured according to ASTM D4498 with a 500 gram weight using a Cheminstruments OSI-8 programmable oven in the shear mode. The tests are started at 40° C. and the oven temperature is ramped at an average rate of 0.5° C./minute. The temperature at which the specimen failed is recorded.

Samples for PAFT and SAFT testing are prepared using two sheets of 60 g/m² Kraft paper, each of 6×12 in (152×305 mm) dimensions. On the bottom sheet, lengthwise and separated by a gap of 1 in (25 mm), are adhered in parallel fashion two 1.75 in or 2 in (45 mm or 51 mm) wide strips of a one sided, pressure-sensitive tape such as masking tape. The composition sample to be tested is heated to 177° C. (350° F.) and drizzled in an even manner down the center of the gap formed between the tape strips. Then, before the composition can unduly thicken, two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the composition in the gap between the tape strips and the second rod evenly compress the second sheet over the top of the gap and on top of the tape strips. Thus, a single 1 inch (25.4 mm) wide strip of sample composition is created between the two tape strips, and bonding the paper sheets. The sheets so bonded are cut crosswise into strips of width 1 inch (25.4 mm) and length of 3 inches (76.2 mm), each strip having a 1×1 in (25×25 mm) adhesive sample bond in the center. The strips are conditioned for 24 hours at room temperature (23° C.) and 54% relative humidity. The strips are then be employed in the PAFT and SAFT testing, as desired. Two specimens from each compositions sample are tested, and the average failure temperature for PAFT and SAFT is recorded.

Open Time and Set Time

Set Time and Open Time properties are determined using an INATEC Bond Tester, a mechanical testing device used to form and tear test bonds. The INATEC Bond Tester is heated to 173° C., and measured via a hand-held thermocouple. The bottom substrate, 2.5" (63.5 mm)×2" (50.8 mm) corrugated board, is moved on a track under the adhesive pot which delivers a bead of adhesive in the range of from 0.26 to 0.29 g/linear meter. The adhesive pot pressure is increased, or decreased, in order to maintain consistent bead size. A top substrate, 2.5" (63.5 mm)×2" (50.8 mm), is applied to the bottom substrate, with a pressure of 2.5 bar (250 kPa). The INATEC has 2 timers, capable of measuring set-time and open-time potential to the nearest second.

Open Time measurement—is the longest time period between adhesive application to one substrate, and the bonding with a second substrate, that results in a 50% fiber-tearing bond. For testing, compression time (or set time) is set to the time determined by set time measurement to achieve 100% fiber tear. Open time is set at 10 seconds and increased in 10 second intervals until less than 50% fiber tear is achieved. The open time is decreased by 5 sec and % fiber tear is determined. Finally, open time is changed by 1 second interval to determine the maximum allowable time to achieve 50% or greater fiber tear.

Set Time measurement—is the minimum compression time required to achieve a fiber-tearing bond. For testing, open time is set at 2 seconds (sec). A bond is formed as the top substrate is compressed onto the bottom substrate. After a preset compression time, a tear test is executed as the top substrate was pulled from the bottom substrate. A visual assessment is then made to determine the percentage of fiber tear achieved under the preset test conditions. The set time is changed in one second intervals, determining the time to achieve 100% fiber tear and less than 50% fiber tear. The set time is recorded as the shortest time, to the nearest second, at which a minimum of 50% fiber tear is obtained.

DETAILED DESCRIPTION

The present disclosure provides a composition. The a composition contains (A) an ethylene/α-olefin copolymer containing (i) ethylene and (ii) from 20 wt % to 35 wt % $C_6$-$C_8$ α-olefin comonomer, the ethylene/α-olefin copolymer having a density from 0.880 g/cc to 0.895 g/cc, a melt viscosity, at 177° C., from 4,000 mPa·s to 20,000 mPa·s, and a glass transition temperature from −55° C. to −20° C.; (B) a tackifier; and (C) a wax.

In an embodiment, the composition is an adhesive composition.

A. Ethylene/α-Olefin Copolymer

The adhesive composition contains an ethylene/α-olefin copolymer. The ethylene/α-olefin copolymer contains (i) ethylene and (ii) from 20 wt % to 35 wt % $C_6$-$C_8$ α-olefin comonomer. The ethylene/α-olefin copolymer has a density from 0.880 g/cc to 0.895 g/cc, a melt viscosity, at 177° C., from 4,000 mPa·s to 20,000 mPa·s, and a glass transition temperature from −55° C. to −20° C.

Nonlimiting examples of suitable ethylene/α-olefin copolymer include LDPE and linear polyethylene. Nonlimiting examples of linear polyethylene include LLDPE, ULDPE, VLDPE, EPE, ethylene/α-olefin multi-block copolymers (also known as OBC), m-LLDPE, substantially linear, or linear, plastomers/elastomers (POP), and combinations thereof. In an embodiment, the ethylene/α-olefin copolymer is a POP.

The ethylene/α-olefin copolymer contains, consists essentially of, or consists of (i) ethylene and (ii) $C_6$-$C_8$ α-olefin comonomer. In an embodiment, the α-olefin comonomer is selected from hexene and octene. In a further embodiment, the α-olefin is hexene.

In an embodiment, the ethylene/α-olefin copolymer is ethylene/hexene copolymer.

The ethylene/α-olefin copolymer contains (i) ethylene and (ii) from 20 wt % to 35 wt % $C_6$-$C_8$ α-olefin comonomer, based on the total weight of the ethylene/α-olefin copolymer. In an embodiment, the ethylene/α-olefin copolymer contains (i) from 65 wt %, or 70 wt %, or 75 wt % to 80 wt % units derived from ethylene; and (ii) a reciprocal amount of units derived from $C_6$-$C_8$ α-olefin comonomer, or from 20 wt % to 25 wt %, or 30 wt %, or 35 wt % units derived from $C_6$-$C_8$ α-olefin comonomer, based on the total weight of the ethylene/α-olefin copolymer.

The ethylene/α-olefin copolymer has a density from 0.880 g/cc to 0.895 g/cc. In an embodiment, the ethylene/α-olefin copolymer has a density from 0.880 g/cc, or 0.885 g/cc to 0.890 g/cc, or 0.895 g/cc. In another embodiment, the ethylene/α-olefin copolymer has a density from 0.880 g/cc to 0.890 g/cc, or from 0.880 g/cc to 0.885 g/cc, or from 0.885 g/cc to 0.890 g/cc.

The ethylene/α-olefin copolymer has a melt viscosity, at 177° C., from 4,000 mPa·s to 20,000 mPa·s. In an embodiment, the ethylene/α-olefin copolymer has a melt viscosity, at 177° C., from 4000 mPa·s, or 5000 mPa·s, or 10000 mPa·s, or 12000 mPa·s, or 12500 mPa·s to 13000 mPa·s, or 15000 mPa·s, or 18000 mPa·s, or 20000 mPa·s. In a further embodiment, the ethylene/α-olefin copolymer has a melt viscosity, at 177° C., from 5000 mPa·s to 15000 mPa·s, or from 10000 mPa·s to 15000 mPa·s.

The ethylene/α-olefin copolymer has a glass transition temperature, Tg, from −55° C. to −20° C. In an embodiment, the ethylene/α-olefin copolymer has a glass transition temperature from −55° C., or −50° C., or −48° C. to −45° C., or −40° C., or −35° C., or −30° C., or −25° C. In another embodiment, the ethylene/α-olefin copolymer has a glass transition temperature, Tg, from −50° C. to −30° C., or from −50° C. to −40° C., or from −48° C. to −45° C.

In an embodiment, the ethylene/α-olefin copolymer has a melting temperature, Tm, from 40° C., or 50° C., or 55° C., or 60° C., or 65° C., or 70° C., or 75° C., or 77° C., or 80° C. to 83° C., or 85° C., or 90° C., or 100° C., or 110° C., or 120° C. In another embodiment, the ethylene/α-olefin copolymer has a melting temperature, Tm, from 40° C. to 120° C., or from 70° C. to 100° C., or from 80° C. to 120° C., or from 80° C. to 100° C., or from 77° C. to 83° C.

In an embodiment, the ethylene/α-olefin copolymer has a crystallization temperature, Tc, from 50° C., or 55° C., or 60° C. to 64° C., or 65° C., or 70° C., or 75° C., or 80° C., or 90° C. In another embodiment, the ethylene/α-olefin copolymer has a crystallization temperature, Tc, from 50° C. to 90° C., or from 55° C. to 80° C., or from 60° C. to 65° C.

In an embodiment, the ethylene/α-olefin copolymer is an ethylene/hexene copolymer consisting of (i) from 65 wt % to 80 wt %, or from 70 wt % to 80 wt %, or from 75 wt % to 80 wt % ethylene; and (ii) from 20 wt % to 35 wt %, or from 20 wt % to 30 wt %, or from 20 wt % to 25 wt % hexene, based on the total weight of the ethylene/hexene copolymer. The ethylene/hexene copolymer has (i) a density from 0.880 g/cc to 0.895 g/cc, or from 0.885 g/cc to 0.890 g/cc; (ii) a melt viscosity, at 177° C., from 4,000 mPa·s to 20,000 mPa·s, or from 5000 mPa·s to 15000 mPa·s, or from 10000 mPa·s to 15000 mPa·s; and (iii) a glass transition temperature, Tg, from −55° C. to −20° C., or from −50° C. to −30° C., or from −50° C. to −40° C., or from −48° C. to −45° C. In an embodiment, the ethylene/hexene copolymer also has one or both of the following properties: (iv) a melting temperature, Tm, from 40° C. to 120° C., or from 70° C. to 110° C., or from 80° C. to 120° C., or from 80° C. to 90° C., or from 77° C. to 83° C.; and/or (v) a crystallization temperature, Tc, from 50° C. to 90° C., or from 55° C. to 80° C., or from 60° C. to 65° C.

The ethylene/α-olefin copolymer may comprise two or more embodiments disclosed herein.

B. Tackifier

The composition includes a tackifier. The tackifier may modify the properties of the composition, such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In particular embodiments, the tackifier is used to wet out adherent surfaces and/or improve the adhesion to the adherent surfaces.

Tackifiers suitable for the composition disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and (9) combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C., or 100° C. to 130° C., or 150° C. They are also available with differing levels of hydrogenation, or saturation, which is another commonly used term. Nonlimiting examples of suitable tackifying resins include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130°

C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of 140° C. Other nonlimiting examples of suitable tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment, the tackifier is a hydrogenated hydrocarbon resin. In a further embodiment, the tackifier is a $C_4$-$C_{24}$, or a $C_6$-$C_{20}$, or a $C_8$-$C_{18}$, or a $C_8$-$C_{10}$, or a $C_9$ hydrogenated hydrocarbon resin. A nonlimiting example of a suitable $C_9$ hydrogenated hydrocarbon resin is REGALITE™ R1100, available from Eastman Chemical Company.

In an embodiment, the tackifier has a Ring and Ball softening point from 95° C., or 97° C., or 100° C. to 105° C., or 110° C., or 115° C., or 120° C., or 130° C., or 140° C., or 150° C. In a further embodiment, the tackifier has a Ring and Ball softening point from 95° C. to 150° C., or from 95° C. to 120° C., or from 95° C. to 110° C., or from 100° C. to 105° C.

In an embodiment, the tackifier is a $C_4$-$C_{24}$, or a $C_6$-$C_{20}$, or a $C_8$-$C_{18}$, or a $C_8$-$C_{10}$, or a $C_9$ hydrogenated hydrocarbon resin; and the tackifier has a Ring and Ball softening point from 95° C. to 150° C., or from 95° C. to 120° C., or from 95° C. to 110° C., or from 100° C. to 105° C.

In an embodiment, the tackifier, or further the composition, is void of, or substantially void of, rosin esters. A "rosin ester" is a polymer containing, in polymerized form, rosin and, optionally, one or more dienes, which polymeric structure is then esterified with one or more polyols, and then the esterified polymeric structure is optionally hydrogenated. It is understood that as an ester, the rosin ester contains at least one ester group with oxygen atoms, the rosin ester thereby excluding tackifier composed only of hydrogen and carbon atoms. A "polyol" is an alcohol containing at least two hydroxyl groups (—OH).

The tackifier may comprise two or more embodiments disclosed herein.

C. Wax

The composition includes a wax. The wax may be used to reduce the melt viscosity of the composition and to adjust the open time and set time of the composition. Nonlimiting examples of suitable wax include ethylene-based polymer wax, propylene-based polymer wax, paraffin wax, microcrystalline wax, by-product polyethylene wax, Fischer-Tropsch wax, oxidized Fischer-Tropsch wax, functionalized wax such as hydroxy stearamide wax and fatty amide wax, and combinations thereof.

Ethylene-Based Polymer Wax

In an embodiment, the wax is an ethylene-based polymer wax.

An "ethylene-based polymer wax" is an ethylene-based polymer having a melt viscosity, at 135° C., that is less than, or equal to (≤) 1,000 mPa·s, or ≤500 mPa·s, or ≤100 mPa·s, or ≤50 mPa·s, or ≤10 mPa·s. The ethylene-based polymer wax is composed of a majority amount (i.e., greater than 50 wt %) of polymerized ethylene monomer and optional α-olefin comonomer.

In an embodiment, the ethylene-based polymer wax is selected from a high density, low molecular weight polyethylene wax, a by-product polyethylene wax, a Fischer-Tropsch wax containing an ethylene-based polymer, oxidized Fischer-Tropsch waxes containing an ethylene-based polymer, functionalized polyethylene waxes, and combinations thereof.

In an embodiment, the ethylene-based polymer wax is not functionalized.

In an embodiment, the ethylene-based polymer wax is a Fischer-Tropsch wax containing an ethylene-based polymer. Nonlimiting examples of Fischer-Tropsch waxes containing ethylene-based polymer include SASOL™ waxes such as SASOLWAX™ H1, available from the Sasol Wax Company.

In an embodiment, the ethylene-based polymer wax has a melt viscosity, at 135° C., from 1 mPa·s, or 2 mPa·s, or 3 mPa·s, or 4 mPa·s, or 5 mPa·s, or 6 mPa·s, or 7 mPa·s, or 8 mPa·s to 10 mPa·s, or 20 mPa·s, or 50 mPa·s, or 100 mPa·s, or 200 mPa·s, or 300 mPa·s, or 400 mPa·s, or 500 mPa·s, or 750 mPa·s, or less than 1,000 mPa·s. In another embodiment, the ethylene-based polymer wax has a melt viscosity, at 135° C., from 1 mPa·s to less than 1,000 mPa·s, or from 1 mPa·s to 100 mPa·s, or from 1 mPa·s to 50 mPa·s, or from 1 mPa·s to 10 mPa·s, or from 5 mPa·s to 10 mPa·s.

In an embodiment, the ethylene-based polymer wax has a density from 0.880 g/cc, or 0.885 g/cc, or 0.890 g/cc, or 0.895 g/cc, or 0.900 g/cc, or 0.910 g/cc to 0.920 g/cc, or 0.930 g/cc, or 0.940 g/cc, or 0.950 g/cc, or 0.960 g/cc, or 0.970 g/cc. In another embodiment, the ethylene-based polymer wax has a density from 0.880 g/cc to 0.970 g/cc, or from 0.890 g/cc to 0.940 g/cc, or from 0.900 g/cc to 0.920 g/cc, or from 0.895 g/cc to 0.905 g/cc.

In an embodiment, the ethylene-based polymer wax has one, some, or all of the following properties: (i) a melt viscosity, at 135° C., from 1 mPa·s to less than 1,000 mPa·s, or from 1 mPa·s to 100 mPa·s, or from 1 mPa·s to 50 mPa·s, or from 1 mPa·s to 10 mPa·s, or from 5 mPa·s to 10 mPa·s; and/or (ii) a density from 0.880 g/cc to 0.970 g/cc, or from 0.890 g/cc to 0.940 g/cc, or from 0.900 g/cc to 0.920 g/cc, or from 0.895 g/cc to 0.905 g/cc; and/or (iii) a melting point greater than 80° C., or greater than 90° C.; and/or (iv) an acid value from 0 mg KOH/g to 0.1 mg KOH/g, or 0.5 mg KOH/g, or 1.0 mg KOH/g; and/or (v) a drop point from 100° C. to 120° C., or from 110° C. to 115° C. In a further embodiment, the ethylene-based polymer wax is a Fischer-Tropsch wax.

The ethylene-based polymer wax may comprise two or more embodiments disclosed herein.

Propylene-Based Polymer Wax

In an embodiment, the wax is a propylene-based polymer wax.

A "propylene-based polymer wax" is a propylene-based polymer having a melt viscosity, at 170° C., that is less than, or equal to (≤) 1,000 mPa·s, or ≤500 mPa·s, or ≤100 mPa·s, or 50 mPa·s. The propylene-based polymer wax is composed of a majority amount (i.e., greater than 50 wt %) of polymerized propylene monomer and optional α-olefin comonomer. The propylene-based polymer wax may be produced by way of Ziegler-Natta catalyst polymerization or metallocene catalyst polymerization yielding a Ziegler-Natta catalyzed propylene-based polymer wax or a metallocene-catalyzed propylene-based polymer wax, respectively.

In an embodiment, the propylene-based polymer wax is a propylene homopolymer.

In an embodiment, the propylene-based polymer wax is a propylene homopolymer, and excludes functionalized wax, polyethylene wax, Fischer-Tropsch wax, animal wax, plant wax, petroleum-derived wax (paraffin wax, microcrystalline wax), and montan wax.

Nonlimiting examples of suitable propylene-based polymer wax are waxes sold under the tradename LICOCENE, available from Clariant.

In an embodiment, the propylene-based polymer wax has one or both of the following properties: (i) a density from 0.89 g/cc, or 0.90 g/cc to 0.91 g/cc; and/or (ii) a melt viscosity, at 170° C., from 40 mPa·s, or 50 mPa·s, or 60 mPa·s to 65 mPa·s, or 70 mPa·s, or 75 mPa·s, or 80 mPa·s, or 90 mPa·s, or 100 mPa·s.

The propylene-based polymer wax may comprise two or more embodiments disclosed herein.

The wax may comprise two or more embodiments disclosed herein.

D. Optional Additive

In an embodiment, the composition contains (A) the ethylene/α-olefin copolymer; (B) the tackifier; (C) the wax; and (D) an optional additive.

Nonlimiting examples of suitable additives include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, water, adhesion promoters (such as maleic anhydride-functionalized polyolefins), and combinations thereof.

In an embodiment, the composition includes an antioxidant. The antioxidant protects the composition from degradation caused by reaction with oxygen induced by such things as heat, light, or residual catalyst from the raw materials such as the tackifying resin. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3(3,5-d i-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. Such antioxidants are commercially available from BASF and include Irganox™ 565, 1010, 1076 and 1726, which are hindered phenols. These are primary antioxidants act as radical scavengers and may be used alone or in combination with other antioxidants such as phosphite antioxidants like Irgafos' 168, available from BASF. Phosphite antioxidant are considered secondary antioxidant and are not generally used alone. These are primarily used as peroxide decomposers. Other available antioxidants are Cyanox™ LTDP, available from Solvay, and Ethanox™ 330, available from SI Group. Many such antioxidants are available either to be used alone or in combination with other such antioxidants.

In an embodiment, the composition includes an antioxidant that is a hindered phenol antioxidant. In a further embodiment, the hindered phenol antioxidant is pentaerythrityl tetrakis-3(3,5-di-tert-butyl-4-hydroxyphenyl)-propionate, commercially available as IRGANOX™ 1010 from BASF.

The optional additive may comprise two or more embodiments disclosed herein.

F. Composition

The present composition contains (A) the ethylene/α-olefin copolymer; (B) the tackifier; (C) the wax. In an embodiment, the composition contains (D) an optional additive.

In an embodiment, the composition is an adhesive composition, and further a hot melt adhesive (HMA) composition.

In an embodiment, the composition contains from 20 wt %, or 25 wt %, or 30 wt %, or 35 wt %, or 40 wt % to 45 wt %, or 50 wt %, or 55 wt %, or 60 wt %, or 65 wt %, or 70 wt % of the ethylene/α-olefin copolymer, based on the total weight of the composition. In another embodiment, the composition contains from 20 wt % to 70 wt %, or from 25 wt % to 50 wt %, or from 35 wt % to 45 wt %, or 40 wt % of the ethylene/α-olefin copolymer, based on the total weight of the composition. In another embodiment, the composition contains from 20 wt % to less than 50 wt %, or less than 45 wt % ethylene/α-olefin copolymer, based on the total weight of the composition.

In an embodiment, the composition contains from 20 wt %, or 25 wt %, or 30 wt %, or 35 wt % to 40 wt %, or 45 wt %, or 50 wt %, or 55 wt %, or 60 wt % tackifier, based on the total weight of the composition. In another embodiment, the composition contains from 20 wt % to 60 wt %, or from 25 wt % to 50 wt %, or from 35 wt % to 45 wt %, or from 35 wt % to 40 wt % tackifier, based on the total weight of the composition. In another embodiment, the composition contains from 20 wt % to less than 50 wt %, or less than 40 wt % tackifier, based on the total weight of the composition.

In an embodiment, the composition contains from 10 wt %, or 15 wt %, or 20 wt % to 25 wt %, or 30 wt %, or 35 wt %, or 40 wt % wax, based on the total weight of the composition. In another embodiment, the composition contains from 10 wt % to 40 wt %, or from 15 wt % to 30 wt %, or from 15 wt % to 25 wt %, or from 15 wt % to 20 wt % wax, based on the total weight of the composition.

In an embodiment, the composition contains from 0 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % of one of more optional additive, based on total weight of the composition. In another embodiment, the composition contains from 0 wt % to 3 wt %, or from 0.1 wt % to 1.0 wt % of one of more optional additive, based on total weight of the composition.

In an embodiment, the composition contains, consists essentially of, or consists of: (A) from 20 wt % to 70 wt %, or from 25 wt % to 50 wt %, or from 35 wt % to 45 wt %, or 40 wt % of the ethylene/α-olefin copolymer; (B) from 20 wt % to 60 wt %, or from 25 wt % to 50 wt %, or from 35 wt % to 45 wt %, or from 35 wt % to 40 wt % tackifier; (C) from 10 wt % to 40 wt %, or from 15 wt % to 30 wt %, or from 15 wt % to 25 wt %, or from 15 wt % to 20 wt % wax; and (D) from 0 wt % to 3 wt %, or from 0.1 wt % to 1.0 wt % of one of more optional additive, based on total weight of the composition.

In an embodiment, the (A) ethylene/α-olefin copolymer, the (B) tackifier, and the (C) wax are the only polymeric components present in the composition. In other words, the composition is void of, or substantially void of, polymers that are compositionally, structurally, and/or physically distinct from the (A) ethylene/α-olefin copolymer, the (B) tackifier, and the (C) wax.

In an embodiment, the composition, is void of, or substantially void of, rosin ester.

In an embodiment, the composition has a melt viscosity, at 177° C., from 500 mPa·s, or 600 mPa·s, or 700 mPa·s, or 750 mPa·s, or 800 mPa·s to 840 mPa·s, or 850 mPa·s, or 900 mPa·s, or 1200 mPa·s, or 1500 mPa·s, or 2000 mPa·s. In another embodiment, the composition has a melt viscosity, at 177° C., from 500 mPa·s to 2000 mPa·s, or from 500 mPa·s to 900 mPa·s, or from 700 mPa·sto 900 mPa·s, or from 800 mPa·s to 850 mPa·s, or from 800 mPa·s to 840 mPa·s. A melt viscosity, at 177° C., from 500 mPa·s to 2000 mPa·s is advantageous in HMA applications because it optimizes the wetting of a substrate with the composition, and improves the processability of the composition and articles formed with the composition.

In an embodiment, the composition has a set time of less than 3 seconds; or less than or equal to 2 seconds. In another embodiment, the composition has a set time from greater than 0 seconds to 2 seconds, or less than 3 seconds. In a further embodiment, the composition has a set time from greater than 0 to 2 seconds. A low set time is advantageous in HMA applications because it enables faster line speeds.

In an embodiment, the composition has an open time greater than 10 seconds, or greater than 15 seconds.

In an embodiment, the composition has a heat stress greater than 50° C., or greater than 55° C., or greater than 60° C., or equal to or greater than 65° C. A high heat stress is advantageous in HMA applications because it indicates that the composition exhibits improved high temperature resistance, and enables articles (such as packages) formed with the composition to stay adhered in high temperature environments.

In an embodiment, the composition has a peel adhesion failure temperature (PAFT) greater than 50° C., or greater than 55° C., or greater than 60° C. In another embodiment, the composition has a PAFT from 50° C. to 80° C., or from 55° C. to 80° C., or from 60° C. to 80° C., or from 62° C. to 80° C. A high PAFT is advantageous in HMA applications because it indicates that the composition exhibits improved high temperature resistance, and enables articles (such as packages) formed with the composition to stay adhered in high temperature environments.

In an embodiment, the composition has a shear adhesion failure temperature (SAFT) greater than 80° C., or greater than 90° C. In another embodiment, the composition has a SAFT from 80° C. to 100° C., or from 90° C. to 100° C., or from 94° C. to 100° C. A high SAFT is advantageous in HMA applications because it indicates that the composition exhibits improved high temperature resistance, and enables articles (such as packages) formed with the composition to stay adhered in high temperature environments.

In an embodiment, the composition has a fiber tear greater than 90%, or greater than 91%, or equal to or greater than 92% at a temperature range from −20° C. to 60° C. In another embodiment, the composition has a fiber tear from 90% to 100%, or from 91% to 100%, or from 92% to 100% at a temperature range from −20° C. to 60° C. A high fiber tear at a temperature range from −20° C. to 60° C. is advantageous in HMA applications because it indicates that articles (such as packages) formed with the composition will adhere over a wide range of temperatures.

In an embodiment, the composition has a fiber tear greater than 90%, or greater than 91%, or equal to or greater than 92% at a temperature range from −20° C. to 0° C. In another embodiment, the composition has a fiber tear from 90% to 100%, or from 91% to 100%, or from 92% to 100% at a temperature range from −20° C. to 0° C.

In an embodiment, the composition has one, some, or all of the following properties: (i) a melt viscosity, at 177° C., from 500 mPa·s to 2000 mPa·s, or from 500 mPa·s to 900 mPa·s, or from 700 mPa·s to 900 mPa·s, or from 800 mPa·s to 850 mPa·s, or from 800 mPa·s to 840 mPa·s; and/or (ii) a set time from greater than 0 seconds to 2 seconds, or less than 3 seconds; and/or (iii) an open time greater than 10 seconds, or greater than 15 seconds; and/or (iv) a heat stress greater than 50° C., or greater than 55° C., or greater than 60° C., or equal to or greater than 65° C.; and/or (v) a PAFT from 50° C. to 80° C., or from 55° C. to 80° C., or from 60° C. to 80° C., or from 62° C. to 80° C.; and/or (vi) a SAFT from 80° C. to 100° C., or from 90° C. to 100° C., or from 94° C. to 100° C.; and/or (vii) a fiber tear from 90% to 100%, or from 91% to 100%, or from 92% to 100% at a temperature range from −20° C. to 60° C.

In an embodiment, the composition has (i) a set time of less than 3 seconds; and (ii) a fiber tear greater than 90%, or greater than 91%, or equal to or greater than 92% at a temperature range from −20° C. to 60° C. In another embodiment, the composition has (i) a set time from greater than 0 seconds to 2 seconds, or less than 3 seconds; and (ii) a fiber tear from 90% to 100%, or from 91% to 100%, or from 92% to 100% at a temperature range from −20° C. to 60° C.

In an embodiment, the composition has (i) a set time from greater than 0 seconds to 2 seconds, or less than 3 seconds; (ii) a fiber tear from 90% to 100%, or from 91% to 100%, or from 92% to 100% at a temperature range from −20° C. to 60° C.; and (iii) a heat stress greater than 50° C., or greater than 55° C., or greater than 60° C., or equal to or greater than 65° C.

In an embodiment, the composition is an adhesive composition, and further a hot melt adhesive (HMA) composition, and the composition contains, consists essentially of, or consists of:

(A) from 35 wt % to 45 wt %, or 40 wt % ethylene/hexene copolymer, based on total weight of the composition, the ethylene/hexene copolymer consisting of (i) from 75 wt % to 80 wt %, or 75 wt % ethylene; and (ii) from 20 wt % to 25 wt %, or 25 wt % hexene, based on the total weight of the ethylene/hexene copolymer; the ethylene/hexene copolymer having:

(1) a density from 0.880 g/cc to 0.890 g/cc, or 0.885 g/cc;
(2) a melt viscosity, at 177° C., from 4,000 mPa·s to 20,000 mPa·s, or from 5000 mPa·s to 15000 mPa·s, or from 10000 mPa·s to 15000 mPa·s, or 12500 mPa·s;
(3) a glass transition temperature, Tg, from −50° C. to −40° C., or −48° C.; and the ethylene/hexene copolymer optionally has one or both of the following properties: (4) a melting temperature, Tm, 70° C. to 90° C., or from 80° C. to 90° C., or from 77° C. to 83° C., or 80° C.; and/or
   (5) a crystallization temperature, Tc, from 60° C. to 65° C., or 64° C.;
(B) from 35 wt % to 40 wt %, or 39.5 wt % tackifier, based on total weight of the composition, wherein the tackifier is a $C_8$-$C_{10}$, or a $C_9$ hydrogenated hydrocarbon resin; and the tackifier has a Ring and Ball softening point from 100° C. to 105° C.;
(C) from 10 wt % to 40 wt %, or from 15 wt % to 30 wt %, or from 15 wt % to 25 wt %, or from 15 wt % to 20 wt % wax, based on total weight of the composition, wherein the wax is an ethylene-based polymer wax (such as a Fischer-Tropsch wax), and the ethylene-based polymer wax has one, some, or all of the following properties:
   (1) a melt viscosity, at 135° C., from 5 mPa·s to 10 mPa·s, or 8 mPa·s; and/or
   (2) a density from 0.895 g/cc to 0.905 g/cc, or 0.900 g/cc; and/or
   (3) a melting point greater than 80° C., or greater than 90° C.; and/or
   (4) an acid value from 0 mg KOH/g to 0.1 mg KOH/g; and/or
   (5) a drop point from 110° C. to 115° C., or 112° C.; and
(D) from 0 wt % to 3 wt %, or from 0.1 wt % to 1.0 wt % of one of more optional additive (such as an antioxidant), based on total weight of the composition; and the composition has one, some, or all, of the following properties:
   (i) a melt viscosity, at 177° C., from 800 mPa·s to 2000 mPa·s; or from 800 mPa·s to 840 mPa·s; and/or
   (ii) a set time from greater than 0 seconds to 2 seconds, or less than 3 seconds; and/or
   (iii) an open time greater than 15 seconds; and/or
   (iv) a heat stress greater than 60° C., or equal to or greater than 65° C.; and/or
   (v) a PAFT from 60° C. to 70° C., or 62.4° C.; and/or
   (vi) a SAFT from 94° C. to 100° C.; and/or
   (vii) a fiber tear from 92% to 100% at a temperature range from −20° C. to 60° C.; and/or
   (viii) a fiber tear from 92% to 100% at a temperature range from −20° C. to 0° C.

It is understood that the sum of the components in each of the components and compositions disclosed herein, including the foregoing composition, yields 100 weight percent (wt %), based on the total weight of the respective component or composition.

Not wishing to be bound by any particular theory, it is believed that (i) the high density of the ethylene/α-olefin copolymer (i.e., 0.880-0.895 g/cc); and/or (ii) the low viscosity of the ethylene/α-olefin copolymer (i.e., 4,000-20,000 mPa·s) enables the composition containing tackifier and wax to exhibit a low set time (i.e., less than 3 seconds). However, high density and low viscosity in ethylene-based polymers conventionally result in an HMA composition with poor fiber tear (i.e., less than 90%) at a temperature range from −20° C. to 60° C., and particularly at a temperature from −20° C. to 0° C. It was surprisingly found that an HMA composition including (A) ethylene/α-olefin copolymer containing (i) ethylene and (ii) from 20 wt % to 35 wt % $C_6$-$C_8$ α-olefin comonomer, the ethylene/α-olefin copolymer having a density from 0.880 g/cc to 0.895 g/cc, a melt viscosity, at 177° C., from 4,000 mPa·s to 20,000 mPa·s, and a glass transition temperature from −55° C. to −20° C.; (B) a tackifier; and (C) a wax unexpectedly exhibits the combination of (1) a low set time (i.e., less than 3 seconds) and (2) high fiber tear (i.e., equal to or greater than 90%) at a temperature range from −20° C. to 60° C. The combination of low set time and high fiber tear at a temperature range from −20° C. to 60° C. is advantageous in HMA applications because the combination enables faster line speeds, while also enabling articles (such as packages) formed with the composition to adhere over a wide range of temperatures The composition may comprise two or more embodiments disclosed herein.

G. Article

The present disclosure provides an article. The article includes at least one component formed from the present composition.

The composition can be any composition as disclosed above. In an embodiment, the composition is an HMA composition.

Nonlimiting examples of suitable articles include HMA bonded cardboard packaging boxes, multilayer articles, wood articles and non-woven articles.

In an embodiment, the article includes a substrate. The composition is on at least one surface of the substrate. Nonlimiting examples of suitable substrates include film, sheets, fabric, cardboard and wood. In an embodiment, the composition forms a seal between the at least one surface of the substrate and at least one surface of another substrate.

Byway of example, and not limitation, some embodiments of the present disclosure will now be described in detail in the following Examples.

EXAMPLES

A. Preparation of Polymer A

Polymer A is an ethylene/hexene copolymer that is prepared in accordance with the following process and the reaction conditions of Table 1.

All raw materials (monomer and comonomer) and a process solvent (a narrow boiling range high-purity isoparaffinic solvent, Isopar-E or Petrosol) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted to pre-specified component concentrations with purified solvent and pressured to above the reaction pressure. All reaction feed flows are measured with mass flow meters and independently controlled with computer automated valve control systems.

The continuous solution polymerization reactor consists of a liquid full, non-adiabatic, isothermal, circulating, loop reactor, which mimics a continuously stirred tank reactor (CSTR) with heat removal. Independent control of all fresh solvent, monomer, comonomer, hydrogen, and catalyst component feeds is possible. The total fresh feed stream to the reactor (solvent, monomer, comonomer, and hydrogen) is temperature controlled by passing the feed stream through heat exchangers. The total fresh feed to the polymerization reactor is injected into the reactor at four locations with approximately equal reactor volumes between each injection location. The fresh feed is controlled with each injector receiving one-fourth of the total fresh feed mass flow. The catalyst components are injected into the polymerization reactor through specially designed injection stingers. The total catalyst and co-catalyst feeds to the polymerization reactor are injected into the reactor at two locations with approximately equal reactor volumes between each injection location, and with each location receiving half of the total feed mass flow. The primary catalyst component feed is computer-controlled to maintain the reactor monomer conversion at the specified target. The cocatalyst components are fed based on calculated specified molar ratios to the primary catalyst component. Immediately following each reactor feed injection location, the feed streams are mixed with the circulating polymerization reactor contents with static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by pumps.

The final reactor effluent enters a zone where it is deactivated with the addition of and reaction with a suitable reagent (water). At this same reactor exit location, other additives are added for polymer stabilization.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

TABLE 1

Polymer A Polymerization Process Conditions

Comonomer = 1-hexene
Reactor Feed Solvent/Ethylene Mass Flow Ratio (g/g) = 1.91
Reactor Feed Comonomer/Ethylene Mass Flow Ratio (g/g) = 0.59
Reactor Feed Hydrogen/Ethylene Mass Flow Ratio (g/g) = 2.2E−04
Reactor Temperature = 135.0° C.
Reactor Pressure = 36.5 barg
Reactor Ethylene Conversion = 92.0%
Reactor Catalyst = [N-(1,1-dimethylethyl)-1,1-dimethyl-1-[(1,2,3,4,5-.eta.)-2,3,4,5-tetramethyl-2,4-cyclopentadien-1-yl]silanaminato(2-)-.kappa.N][(1,2,3,4-.eta.)-1,3-pentadiene]titanium
Reactor Co-Catalyst 1 = tris(2,3,4,5,6-pentafluorophenyl)borane
Reactor Co-Catalyst 2 = modified methyl aluminoxane
Reactor Co-Catalyst1 to Catalyst Molar Ratio (B to Ti ratio) = 3.0
Reactor Co-Catalyst2 Scavenger Molar Ratio (Al to Ti ratio) = 1.7
Reactor Residence Time = 13.4 minutes The properties of Polymer A are provided below in Table 2.

B. Compositions

Materials used to produce compositions, further hot melt adhesive compositions, are shown in Table 2 below. The starting materials from Table 2 are weighed into a beaker mixer at a 120 g batch size. Mixing occurs under a nitrogen blanket at a temperature of 180° C. Mixing occurs for 30 minutes after all components are melted. The compositions and their application performance data are provided in Table 3 below.

TABLE 2

Starting materials for compositions

| Component | Specification | Source |
|---|---|---|
| AFFINITY GA 1950 | ethylene/1-octene copolymer (ethylene plastomer/elastomer) density = 0.874 g/cc; glass transition temperature ($T_g$) = −56.1° C.; melt viscosity at 177° C. (Brookfield) = 17,000 mPa · s; melting point = 72° C.; 36 wt % octene comonomer; crystallization temperature (Tc) = 54° C. | The Dow Chemical Co. |
| AFFINITY GP 1570 | ethylene/propylene copolymer (ethylene plastomer/elastomer) density = 0.890 g/cc; glass transition temperature ($T_g$) = −56° C.; melt viscosity at 177° C. (Brookfield) = 12,500 mPa · s; melting point = 79° C.; 19 wt % propylene comonomer; crystallization temperature (Tc) = 65° C. | The Dow Chemical Co. |
| Polymer A | ethylene/hexene copolymer (ethylene plastomer/elastomer) density = 0.885 g/cc; glass transition temperature ($T_g$) = −48° C. melt viscosity at 177° C. (Brookfield) = 12,500 mPa · s; melting point = 80° C.; 25 wt % hexene comonomer; crystallization temperature (Tc) = 64° C. | The Dow Chemical Co. |
| REGALITE R1100 | hydrogenated $C_9$ hydrocarbon resin (tackifier) ring and ball softening point = 100° C. | Eastman |
| SASOLWAX H1 | Fischer-Tropsch (FT) wax containing an ethylene-based polymer density = 0.90 g/cc (at 25° C.); drop point = 112° C.; melt viscosity at 135° C. (Brookfield) = 8 mPa · s; melting point = >90° C.; acid value = <0.1 mg KOH/g; | Sasol Wax Company |
| IRGANOX 1010 (AO) | hindered phenol antioxidant (CAS 6683-19-8); density = 1.15 g/cc pentaerythritol tetrakis(3-(3,5-di-tert-butyl-4-hydroxyphenyl)propionate) | BASF |

TABLE 3

| Compositions* | Ex. 1 | CS 2 | CS 3 |
|---|---|---|---|
| Polymer A | 40 | — | — |
| AFFINITY GA 1950 | — | 40 | — |
| AFFINITY GP 1570 | — | — | 40 |
| REGALITE R1100 (tackifier) | 39.5 | 39.5 | 39.5 |
| SASOLWAX H1 (wax) | 20 | 20 | 20 |
| AO | 0.5 | 0.5 | 0.5 |
| Tote | 100 | 100 | 100 |
| Viscosity† @ 177° C. mPa · s | 833 | 970 | 845 |
| Set Time (sec) | 2 | 6 | 4.5 |
| Open Time (sec) | 16 | 30 | 20 |
| Heat Stress (° C.) | 65 | 60 | 55 |
| PAFT (° C.) | 62.4 | 63 | 59 |
| SAFT (° C.) | 94.3 | 94 | 97 |
| Fiber Tear (%) −20° C. | 92 | 100 | 0 |
| 0° C. | 100 | 100 | 44 |
| 23° C. | 100 | 100 | 100 |
| 60° C. | 100 | 100 | 100 |

CS = Comparative Sample
†Viscosity of the composition
*Table 3 values are weight percent (wt %), based on the total weight of the composition As shown in Table 3, CS 2 includes (A) an ethylene/octene copolymer (AFFINITY GA 1950) containing (i) ethylene and (ii) greater than 35 wt % α-olefin comonomer (36 wt % octene), the ethylene/octene copolymer having (i) a density of less than 0.880 g/cc (0.874 g/cc), (ii) a melt viscosity, at 177° C., from 4,000 mPa·s to 20,000 mPa·s (17,000 mPa·s), and (iii) a glass transition temperature, Tg, less than −55° C. (−56.1° C.); (B) tackifier, and (C) wax, and exhibits (1) a set time of greater than 3 seconds (6 seconds). Consequently, CS 2 is unsuitable for HMA applications.

CS 3 includes (A) an ethylene/propylene copolymer (AFFINITY GP 1570) containing (i) ethylene and (ii) less than 20 wt % α-olefin comonomer (19 wt % propylene), the ethylene/propylene copolymer having (i) a density from 0.880 g/cc to 0.895 g/cc (0.890 g/cc), (ii) a melt viscosity, at 177° C., from 4,000 mPa·s to 20,000 mPa·s (12,500 mPa·s), and (iii) a glass transition temperature, Tg, less than −55° C. (−56° C.); (B) tackifier, and (C) wax, and exhibits (1) a set time of greater than 3 seconds (4.5 seconds) and (2) a fiber tear of less 90% (0% at −20° C. and 44% at 0° C.) at a temperature range from −20° C. to 60° C. Consequently, CS 3 is unsuitable for HMA applications.

In contrast, a composition (Ex. 1) including ethylene/hexene copolymer (Polymer A) containing (i) ethylene and (ii) from 20 wt % to 35 wt % hexene comonomer (25 wt % hexene), the ethylene/hexene copolymer having (i) a density from 0.880 g/cc to 0.895 g/cc (0.885 g/cc), (ii) a melt viscosity, at 177° C., from 4,000 mPa·s to 20,000 mPa·s (12,500 mPa·s), and (ii) a glass transition temperature from −55° C. to −20° C. (−48° C.); (B) a tackifier; and (C) a wax unexpectedly exhibits the combination of (1) a set time of less than 3 seconds (2 seconds) and (2) a fiber tear of at least 90% at a temperature range from −20° C. to 60° C. Consequently, Ex. 1 is suitable for HMA applications.

Including an ethylene/α-olefin copolymer with a lower glass transition temperature, Tg, conventionally results in improved fiber tear at a temperature range from −20° C. to 60° C. However, as shown in Table 3, a composition (Ex. 1) including ethylene/hexene copolymer (Polymer A) containing (i) ethylene and (ii) from 20 wt % to 35 wt % hexene comonomer, the ethylene/hexene copolymer having a density from 0.880 g/cc to 0.895 g/cc, a melt viscosity, at 177° C., from 4,000 mPa·s to 20,000 mPa·s, and a glass transition temperature from −55° C. to −20° C.; (B) a tackifier; and (C) a wax unexpectedly exhibits high fiber tear (i.e., equal to or greater than 90%) at a temperature range from −20° C. to 60° C.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A composition comprising:
   (A) from 35 wt % to 45 wt % of a random ethylene/α-olefin copolymer consisting of (i) ethylene and (ii) from 20 wt % to 35 wt % $C_6$-$C_8$ α-olefin comonomer, the ethylene/α-olefin copolymer having
   a density from 0.880 g/cc to 0.895 g/cc;
   a melt viscosity, at 177° C., from 12,000 mPa·s to 20,000 mPa·s;
   a glass transition temperature from −55° C. to −20° C.;
   (B) from 35 wt % to 45 wt % of a tackifier;
   (C) from 15 wt % to 25 wt % of a wax selected from the group consisting of an ethylene-based wax having a melt viscosity at 135° C. less than or equal to 100 mPa·s, a propylene-based wax having a melt viscosity at 170° C. less than or equal to 100 mPa·s, and combinations thereof; and
   wherein (A), (B), and (C) are the only polymeric components present in the composition; and
   the composition has
   (i) a set time of less than 3 seconds; and
   (ii) a fiber tear greater than 90% at a temperature range from −20° C. to 60° C.

2. The composition of claim 1, wherein the ethylene/α-olefin copolymer has a melting temperature from 77° C. to 83° C.

3. The composition of claim 2, wherein the α-olefin comonomer is hexene.

4. The composition of claim 3, wherein the tackifier is a hydrogenated hydrocarbon resin.

5. The composition of claim 1, wherein the composition has a heat stress greater than 60° C.

6. An article comprising at least one component formed from the composition of claim 1.

7. The composition of claim 1, wherein the ethylene/α-olefin copolymer has a crystallization temperature from 60° C. to 65° C.

8. The composition of claim 1, wherein the composition comprises an antioxidant.

9. A composition comprising:
   (A) from 35 wt % to 45 wt % of a single olefin-based polymer that is a random olefin-based polymer having a melt viscosity, at 177° C., from 12,000 mPa·s to 20,000 mPa·s that is an ethylene/α-olefin copolymer consisting of (i) ethylene and (ii) from 20 wt % to 25 wt % $C_6$-$C_8$ α-olefin comonomer, the ethylene/α-olefin copolymer having
   a density from 0.880 g/cc to 0.895 g/cc;
   a glass transition temperature from −55° C. to −20° C.;
   (B) from 35 wt % to 45 wt % of a tackifier; and
   (C) from 15 wt % to 25 wt % of a wax selected from the group consisting of an ethylene-based wax having a melt viscosity at 135° C. less than or equal to 100 mPa·s, a propylene-based wax having a melt viscosity at 170° C. less than or equal to 100 mPa·s, and combinations thereof.

10. The composition of claim 9 wherein (A), (B), and (C) are the only polymeric components present in the composition.

11. The composition of claim 10, wherein the composition comprises an antioxidant.

12. The composition of claim 1 wherein the composition is of void of rosin ester.

13. The composition of claim 11 wherein the composition is of void of rosin ester.

* * * * *